L. E. SHAW.
SPEED INDICATOR.
APPLICATION FILED JUNE 28, 1907.

1,025,164.

Patented May 7, 1912.
4 SHEETS—SHEET 1.

WITNESSES

INVENTOR
Louis E. Shaw
BY
his ATTORNEYS

L. E. SHAW.
SPEED INDICATOR.
APPLICATION FILED JUNE 28, 1907.

1,025,164.

Patented May 7, 1912.
4 SHEETS—SHEET 3.

WITNESSES:
Herman Morris
A. L. O'Brien

INVENTOR
Louis E. Shaw
BY
Pinney, Brickenstein & Ogden
ATTORNEYS

L. E. SHAW.
SPEED INDICATOR.
APPLICATION FILED JUNE 28, 1907.
1,025,164.
Patented May 7, 1912.
4 SHEETS—SHEET 4.
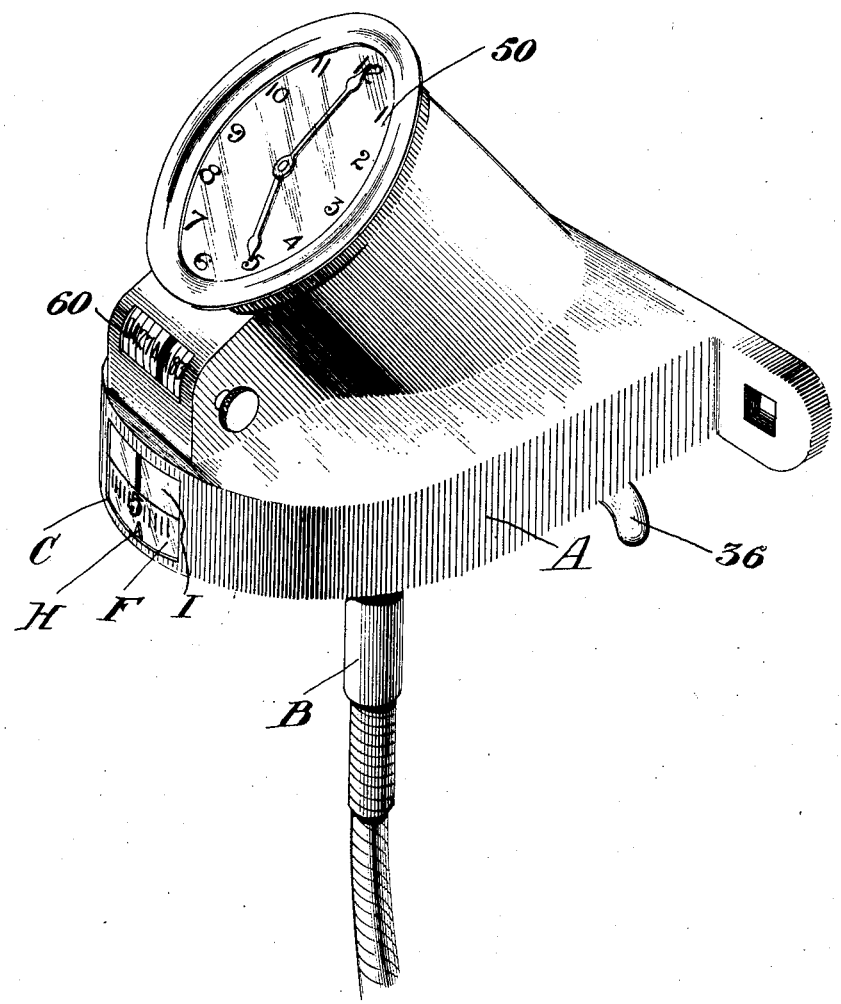

UNITED STATES PATENT OFFICE.

LOUIS E. SHAW, OF NEW YORK, N. Y.

SPEED-INDICATOR.

1,025,164. Specification of Letters Patent. Patented May 7, 1912.

Application filed June 28, 1907. Serial No. 381,191.

*To all whom it may concern:*

Be it known that I, LOUIS E. SHAW, a citizen of the United States, and resident of the borough of Bronx, county of Westchester, city and State of New York, have invented certain new and useful Improvements in Speed-Indicators, of which the following is a specification, accompanied by drawings.

This invention relates to speed indicators and one of the objects of the invention is to show the average speed at which an automobile or other moving vehicle is traveling.

The usual indicators are provided with a needle which fluctuates, thereby showing the speed at any given instant of time, but in order to determine the speed at which the automobile has been traveling for a given time, as for instance, half a minute, it is necessary to average up in the driver's head the different variable speed indications.

In accordance with this invention the instrument automatically indicates the average speed for a given time, as for instance a half minute. At the end of half a minute the speed indication is held at a given average reading, the average speed indication for the next half a minute is read on another portion of the instrument and so on. Thus the driver is enabled to tell instantly the average speed at which he has been moving for each thirty seconds of time, and the annoyance and inconvenience of mentally averaging the number of different speed indications is entirely avoided.

Further objects of the invention will hereinafter appear and to these ends the invention consists of a speed indicator for carrying out the above objects embodying the features of construction, combinations of elements and arrangement of parts having the general mode of operation substantially as hereinafter fully described and claimed in this specification and shown in the accompanying drawings, in which,—

Figure 1:
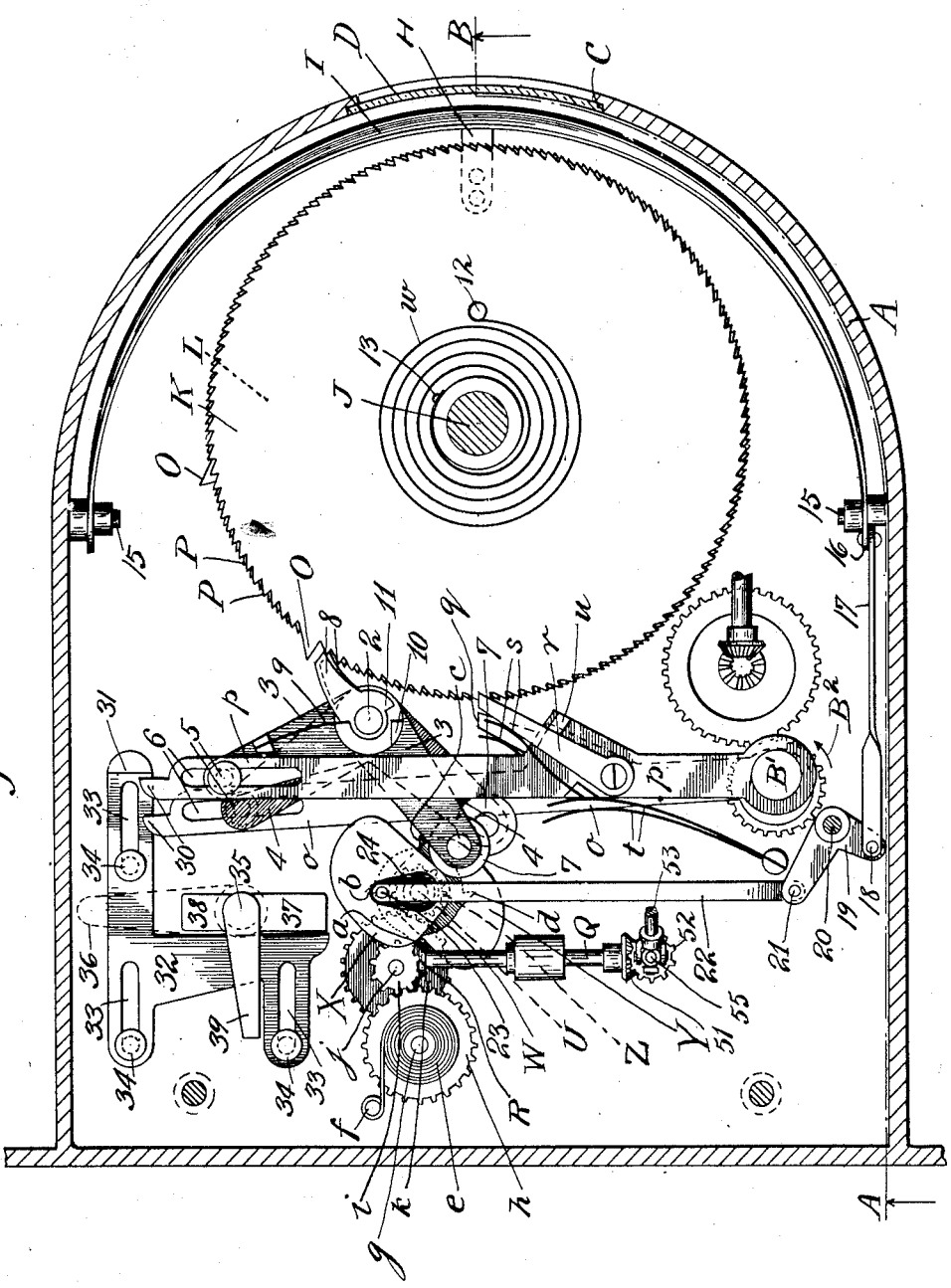
Figure 2:
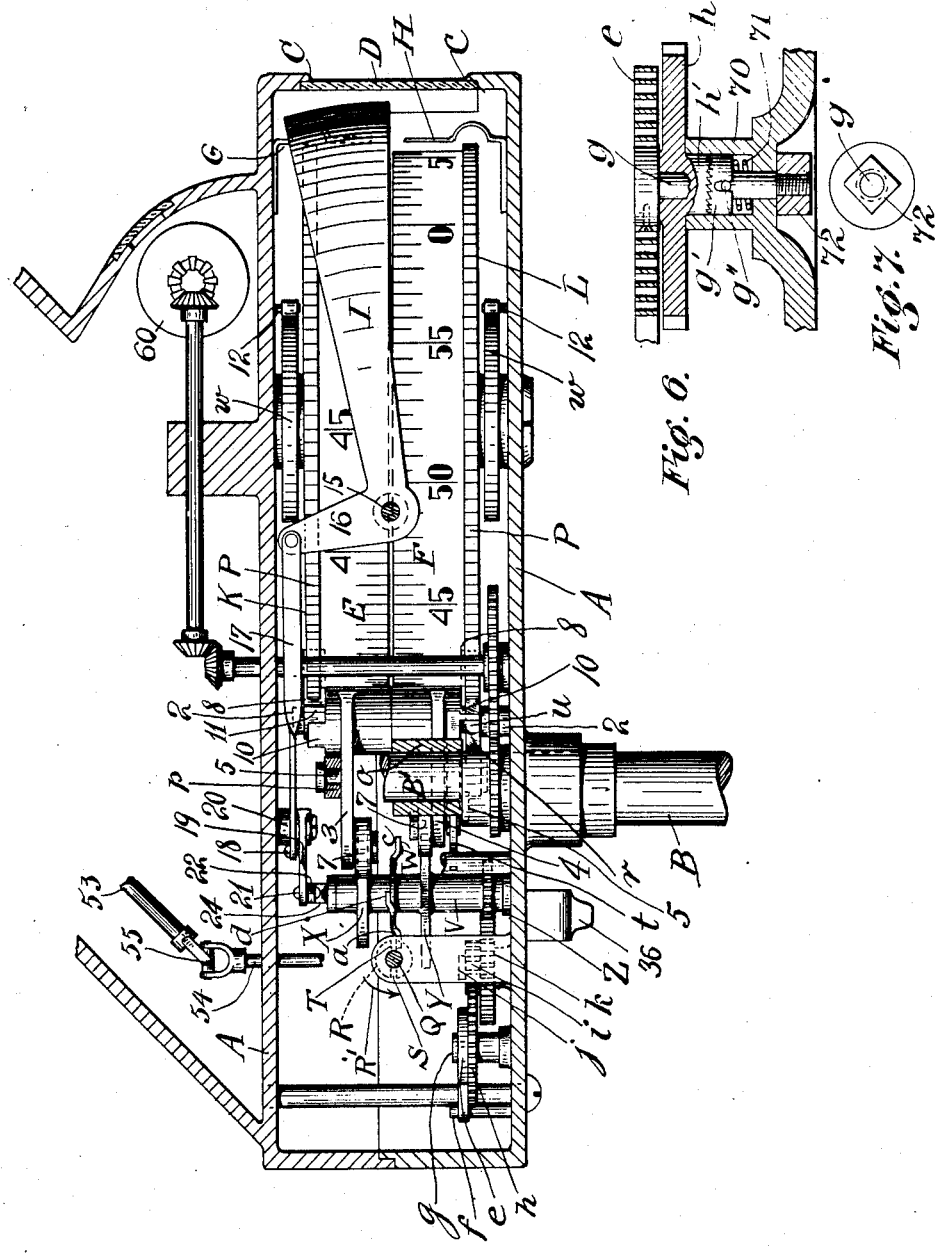
Figure 3:
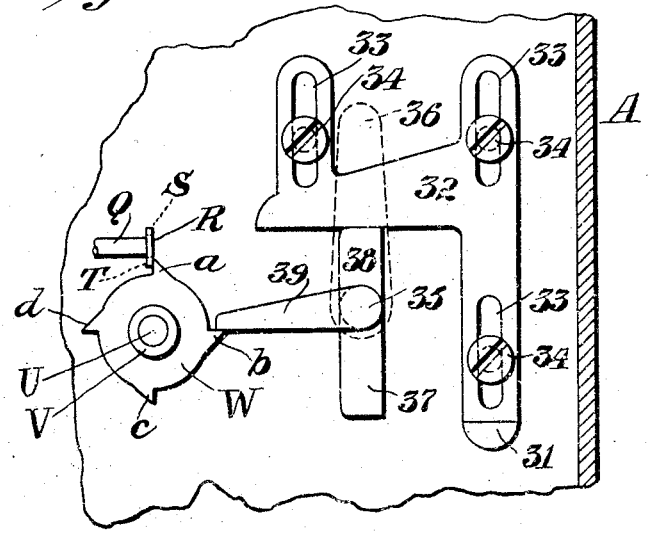
Figure 4:
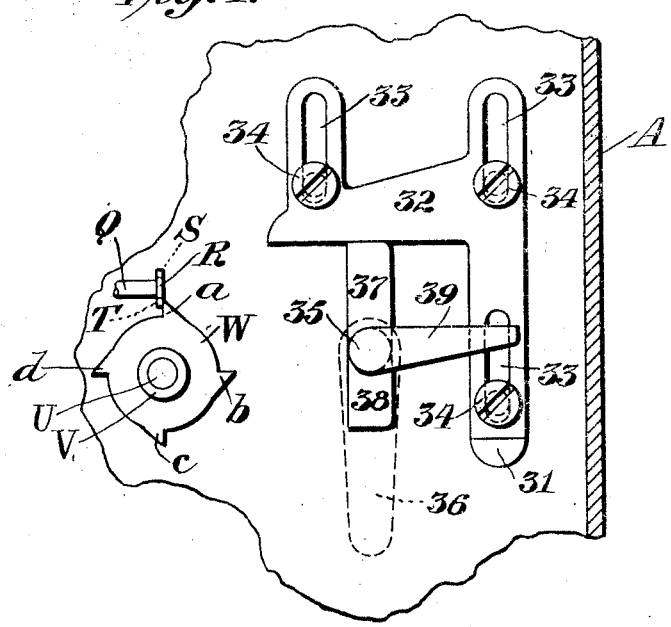

Figure 1 is a top plan view of the speed indicator partly in section with the cover removed; Fig. 2 is a sectional side elevation on the line A B of Fig. 1; Fig. 3 is a detail plan view partly in section and partly broken away of a portion of the instrument shown in Fig. 1 with the parts in different position; Fig. 4 is a detail view of the parts shown in Fig. 2 in still another position; Fig. 5 is a perspective view of the speed indicator showing the face of the clock and the odometer scale. Fig. 6 is a sectional detail and Fig. 7 a bottom view of the mounting of the spring $e$ and gear $h$.

Referring to the drawings, A represents a suitable casing for the instrument adapted to be secured to any suitable part of the automobile or other moving vehicle. Within the casing is arranged the mechanism of the instrument, and B is the main shaft adapted to be geared or connected in any suitable manner to one of the forward wheels of an automobile, or to the driving shaft or any other rotating part from which the average speed of the vehicle is to be taken. The shaft B should be geared by a suitable form of reduction gearing or other connections to bring the necessary movement of the parts of the instrument within the desired limits since the wheel of an automobile or shaft of the engine of a motor boat, for instance, rotates usually too rapidly for direct connection. The top and bottom of the casing A are suitably secured together in any desired manner whereby the mechanism of the instrument may be assembled and inspected. An aperture C is provided for the casing covered by a sheet of glass or other transparent material D to enable the scales E and F, and pointers G and H to be viewed in accordance with the operation of the instrument.

In accordance with this invention the shaft B is operatively connected to move one or the other of the scales E and F through a distance proportional to the distance traveled by the machine in a given period of time, in this instance during one half a minute. First the scale E for instance is moved a distance proportional to the travel of the machine for a half minute, and then the movement of the scale E is discontinued leaving the reading for the average speed during a half minute indicated at the opening C, while the other scale F is automatically connected to be moved through a distance proportional to the travel of the machine for another half minute, at the end of which time it is automatically stopped, while the first scale E is returned to zero and so on. A shield I is automatically thrown in front of one scale or the other so that the scale which is moving is hidden from view and the reading is indicated by the stationary scale.

On the shaft J suitably supported between the top and bottom of the casing A are loosely mounted scales E and F, and each scale as shown is divided into 120 divisions, each division representing a speed of one half mile per hour. Each scale is also provided with a toothed disk K and L, there being 119 teeth, one of said teeth O being of the width of two teeth and projecting beyond the other teeth, forming a stop to stop the scale at zero position. Each of the smaller teeth P corresponds to a division on the corresponding scale.

Suitable clock mechanism 50 is connected to the driving shaft Q to rotate said shaft one revolution per minute. As shown in Fig. 1, on the end of shaft Q is a bevel gear 51 meshing with a bevel gear 52 connected to be driven by the clock mechanism 50 in any suitable manner. In this instance a shaft 53 may be suitably connected to the clock mechanism 50, and said shaft is connected with the shaft 54, Fig. 2, of gear 52, by a universal joint 55. The shafts 53 and 54 are shown broken away in Fig. 2, so as not to obscure the remaining parts on shaft Q, and the end of shaft Q is shown in section for the same reason. Said shaft Q carries a disk R provided with slots S and T. On the stud U carried by the bottom of the casing A is provided a sleeve V having mounted thereon a toothed disk W, two cams X and Y and a pinion Z. The toothed disk W is provided with four teeth $a$, $b$, $c$ and $d$, which coöperate with the slotted disk R. As shown, two of the teeth $a$ and $c$ are bent to one side of the disk W, while the other two teeth $b$ and $d$ project on the other side of the disk, in this instance the teeth $a$ and $c$ projecting downwardly and $b$ and $d$ projecting upwardly. The sleeve V on which the disk W is mounted is placed under constant stress tending to rotate it, in this instance a suitable coiled spring $e$ being connected to operate the sleeve V through gearing connected to the pinion Z. As shown, the spring $e$ is secured to the stud $f$ on the casing and to the shaft $g$ of the gear $h$. I have not shown any details in Figs. 1 and 2 of the spring mounting in respect to the wheel $h$ because any approved arrangement for mounting and winding up the spring may be used, but in Figs. 6 and 7 details of the rewinding mechanism are illustrated in larger scale showing one example thereof. The gear wheel $h$ turns upon its shaft $g$ and is driven by means of the crown ratchet $h'$ formed in one piece with the gear and has bearing internally on the shaft $g$ and externally in the boss 70. The shaft $g$ carries the movable spring pressed coacting crown ratchet $g'$ actuated by the spring 71 as shown and splined or movably pinned to turn with the shaft as by pin $g''$ and slot shown. The lower end of the shaft $g$ protrudes through the casing in the recess shown and carries a square or hexagonal winding head 72 screw threaded left handedly onto the reduced portion and shoulder of the shaft $g$. When applying a winding key to the head 72 and turning left handed, the shaft $g$ turns within the gear $h$ tightening the spring $e$, ratchet $g'$ turning on ratchet $h'$. Said gear $h$ meshes with the pinion $i$ on the shaft $j$ which carries the gear $k$ meshing with the pinion Z. In accordance with this construction the continual rotation of the shaft Q at one revolution per minute will permit an intermittent rotation of the disk W and sleeve V.

In the beginning of the operation of the instrument the tooth $a$ is bearing against the disk R below one of the slots as shown in Fig. 2, and the disk R is rotating in the direction of the arrow R'. The tooth $a$ will continue to bear against the disk R for approximately 29 seconds at which point the other slot in the disk R will fall opposite the tooth $a$, permitting the disk W to rotate through one quarter of a revolution at which point the next tooth $b$ will be brought to a stop against the disk R above the slot. Since said tooth $b$ is staggered or projects on the opposite side of the disk W of tooth $a$, the continued rotation of the disk R will immediately release the tooth $b$ in an interval of time the equivalent of about one second, at which time the slot in the disk R will permit the tooth $b$ to pass, and the disk W will be rotated through another quarter of a revolution until the tooth $c$ abuts against the disk R at a point just below the slot, and said tooth $c$ will be held for approximately 29 seconds more, that is until the 59th second is reached, at which point another slot in the disk R will fall opposite the tooth and permit the rotation of the disk W through the third quarter of a revolution until the tooth $d$ abuts against the disk at a point just above the slot where it will remain for an interval of time approximating one second until released by the continued movement of the disk R permitting the tooth $d$ to pass through the slot, thus rotating the disk W through the fourth quarter of a revolution until brought to a stop by the tooth $a$ bearing against the disk R just below the slot. This cycle of operations has therefore permitted the disk W and sleeve V with the parts connected therewith to rotate intermittently for one minute and this rotation has been divided into two periods of exactly thirty seconds each. The instrument is so devised that during one period of thirty seconds one of the moving scales will be actuated and then brought to rest, and the other scale will be actuated for the next thirty seconds and then brought to rest, and so on back and forward.

Any suitable operative connections may be provided between the main shaft B and the tooth disks K and L for actuating said disks and thereby moving the scales. In this instance suitable pawls and connections therefor are provided for coöperating with the teeth on the disks K and L. This ratchet and pawl mechanism is controlled by the intermittent operation of the sleeve V and parts connected therewith. The cams X and Y are so shaped and timed that the ratchet and pawl mechanism operates for thirty seconds on one tooth disk K and is then thrown out of operation, while the other ratchet and pawl mechanism operates the other tooth disk L for thirty seconds. In the meantime the first tooth disk has been permitted to resume zero position.

The shaft B is provided with an eccentric portion B'. Coöperating with the tooth disks K and L are operating bars $o$ and $p$ connected to be actuated by the eccentric portion of the shaft B, as shown, the operating bars $o$ and $p$ being pivoted on said eccentric portion B' of the shaft B in any suitable manner. The shaft B, as shown, rotates in the direction of the arrow $B^2$, Fig. 1, so that the bars $o$ and $p$ are actuated forward at every revolution. On the operating bars are pivoted the operating pawls $q$ and $r$ spring pressed by means of the springs $s$. The operating bars $o$ and $p$ are spring pressed by means of the springs $t$. The pawls $q$ and $r$ are normally pressed against the stops $u$, and the operating bars $o$ and $p$ and the pawls are normally under pressure tending to force the pawls into engagement with the teeth on the disks K and L. The cams X and Y operate to raise one operating bar or the other at a time to raise one pawl or the other out of engagement with its coöperating tooth disk.

Pivoted on the stud 2 are the bell crank levers 3 and 4, provided with pins 5 at one end engaging the slots 6 in the outer ends of the operating bars $o$ and $p$. The other ends of the bell crank levers 3 and 4 are provided with rollers 7 which form followers for the cams X and Y, so that as the cams X and Y are rotated counterclockwise, as Fig. 1 is viewed, the rollers 7 and the corresponding ends of the bell crank levers 3 and 4 are depressed for a portion of the revolution of the cams, thereby intermittently raising and lowering the outer slotted ends of the operating bars $o$ and $p$, and thus raising and lowering the operating pawls $q$ and $r$ out of and into engagement with the tooth disks K and L. The stud 2 is provided with stop pawls 8 spring pressed by the springs 9, carried by the bell crank levers. Each bell crank lever is also provided with a stop 10 adapted to coöperate with the shoulder 11 on the pawl 8. When the roller 7 on the inner end of the bell crank lever is depressed substantially to the limit of its movement, the stop 10 will be brought into engagement with the shoulder 11, thereby forcing the stop pawl 8 out of engagement with the smaller teeth on the disk, but not raising said stop pawl sufficiently far to clear the large tooth O. When one of the operating pawls $q$ and $r$ has been raised out of engagement with its corresponding tooth disk, and the stop pawl 8 has also been raised, the tension of the spring $w$ connected to the casing at 12 and to the hub of the disk at 13, will cause the reverse rotation of the tooth disk and scale connected thereto until the large tooth O abuts against the stop pawl 8, thus bringing said scale to rest with the zero thereon opposite the corresponding pointer at the opening in the casing. The stop pawl 8 therefore controls the forward movement of its disk and also acts as a stop to limit the backward movement and maintain the scale at zero reading.

The shield I is adapted to be moved back and forth across the scales E and F. As shown, the shield is pivoted at each side of the casing on the studs 15, and one pivoted end is provided with an upwardly extending arm 16 to which is pivoted one end of the rod 17, the other end of which is pivoted at 18 to one end of the bell crank lever 19, said bell crank lever being in turn pivoted to the stud 20 on the casing. The other end of the bell crank lever 19 is pivoted at 21 to the link 22, the other end of which is pivoted at 23 to the crank arm 24 carried on the sleeve V. The crank arm 24 is so positioned on the sleeve V with relation to the cams X and Y that the bell crank lever 19 is rocked to throw the shield over the scale E or F which is being actuated, thereby leaving the scale which is at rest uncovered to permit the reading to be taken.

Manual means are provided for either stopping the entire mechanism from operation except the clock mechanism and the odometer 60, or else for returning both the scales E and F to zero position preparatory to starting the instrument in operation. As shown, the outer ends of the operating levers $o$ and $p$ are provided with fingers 30 adapted to engage the stop 31 on the end of a sliding plate 32. Said plate is provided with slots 33 adapted to slide back and forth on the pins 34. Pivoted in the bottom of the casing is a stud or stem 35 which extends through the casing, and is provided on the outside with the operating arm or handle 36. Inside of the casing the stem 35 is provided with a cross block having one long arm 37 and one short arm 38 adapted to coöperate with the sliding plate 32. The stem 35 is also provided with a finger 39 adapted to coöperate with the tooth disk W and forming a stop therefor. When it is desired to stop the operation of the mechanism, the crank arm or handle 36 is raised into the position indicated in Fig. 3, in which case the short arm 38 of the cross block pushes the sliding plate 32 upwardly and raises the outer ends of the operating levers o and p, thereby raising the pawls q and r out of engagement with the tooth disks, but not raising the outer ends of the operating levers sufficiently far to disengage the stop pawl 8 from the toothed disks. The finger 39 is also carried in horizontal position as indicated in Fig. 3, to bear against one of the teeth of the disk W and prevent said disk from rotating. In case it is desired to return both scales to zero position preparatory to starting the mechanism in operation, the operating arm or handle 36 is moved into the position indicated in Fig. 4 in which case the longer arm 37 of the cross block pushes the sliding disk 34 a distance sufficient to raise the outer ends of the operating levers until both the operating pawls and the stop pawls are disengaged from the small teeth on the disks K and L. Both disks will then be returned to zero position with the large tooth O bearing against the stop pawls 8.

The operation of the speed indicator is as follows: Let it be assumed that both scales are at zero position. Both operating levers o and p cannot be lowered at the same time so that one or the other of the operating pawls q and r will be in operation advancing one or the other of the toothed disks K and L and the scale connected thereto. The continuous rotation of the disk R will permit the intermittent rotation of the toothed disk W and cams X and Y. First, one operating lever o or p is raised for 30 seconds, lifting the operating pawl out of engagement with the teeth on its corresponding disk, and then the other operating lever is raised for 30 seconds, while the first lever is lowered into operating position. After one of the scales has been rotated for 30 seconds, said scale remains stationary at the reading indicated for approximately 29 seconds, and then during an interval approximating one second, said scale is being automatically returned to zero position. The same operation occurs for the other scale, and the shield I is shifted back and forth from one scale to the other, always covering the scale which is being actuated forward.

Each scale E and F has 120 divisions corresponding to the number of teeth on the tooth disks K and L plus one, because the large tooth O on each disk is equal to two small teeth. The scales E and F are graduated into half mile divisions so that any speed may be indicated from one half mile an hour upward to the limit of the instrument. Each small tooth P on a disk K or L corresponds to a speed of one half mile per hour, so that if the machine or vehicle is traveling at a rate of 30 miles an hour, the operating pawl q or r will advance its coöperating tooth disk K or L through the space of 60 teeth and the corresponding scale E or F connected to the disk will be moved forward through 60 half mile divisions until the numeral 30 appears opposite the pointer, thus indicating that the machine has been traveling at the average rate of 30 miles an hour for the last 30 seconds. This indication of 30 miles an hour will remain opposite the opening C in the casing for approximately 29 seconds, while the average speed for the next half minute is being indicated on the other scale.

The following is a concrete example to illustrate the operation of the device. Let it be supposed that the instrument is connected to one of the front wheels of an automobile, which wheel is approximately 15 feet in circumference and would make 350 revolutions in traveling a mile. If the machine was traveling at the rate of 12 miles per hour, the wheel would make 4200 revolutions per hour or 35 revolutions every half a minute. Since there are 120 teeth on each disk K or L and the scales are divided into 120 half mile divisions, it will be necessary for one disk to be actuated forward through the space of 24 of the small teeth P to indicate a speed of 12 miles per hour on the scale. Since the road wheel makes 35 revolutions every half a minute in traveling at a speed of 12 miles an hour, the eccentric shaft B should be geared to the road wheel to rotate in the ratio of 24 to 35.

One of the features of this invention resides in the fact that when the forward movement of the scale ceases, the average speed reading remains clearly exposed until such time as it becomes necessary to return the scale to zero reading preparatory to recommencing the cycle of operations. By this means the reading is maintained in view before the driver of a machine for a given short interval of time and enables the driver to mark the reading and remember it, thus serving as a constant guide for the operation of the machine, whereas an instantaneous reading is often not observed and hence not heeded.

Obviously some features of this invention may be used without others and the invention may be embodied in widely varying forms.

Therefore, without limiting the invention to the devices shown and described, and without enumerating equivalents, I claim and desire to obtain by Letters Patent the following:

1. In a speed indicator, the combination of a pair of pointers and members bearing scales, actuating means connected to impart relative movement to each scale member and its pointer through a distance corresponding to the average speed at which a moving vehicle is traveling, and controlling means connected to alternately arrest the relative movement of each scale member and its pointer and restore the members to zero reading at the end of a given time.

2. In a speed indicator the combination of a pair of speed indicating devices comprising scales and pointer, means for shielding and exposing them alternately to view, means for alternately setting them while hidden to the speed to be indicated and means for arresting them alternately when set.

3. In a speed indicator, the combination of a source of power, driving means connected to be operated thereby at a constant rate of speed, controlling means under constant rotative stress arranged to be released at given intervals of time by the operation of said driving means, a pair of pointers and members bearing scales, actuating means for said scale members adapted to be connected to the rotating part of a moving vehicle and arranged to be controlled by the driving means, and a shield arranged to swing back and forth over said scale members, and connected to be actuated by the controlling means.

4. In a speed indicator, the combination of a main shaft adapted to be connected to the rotating part of a moving vehicle, operating bars eccentrically journaled on said shaft and provided with spring pressed operating pawls, toothed disks adapted to be engaged by said pawls when in operating position, bell-crank levers having one end in engagement with the outer ends of the operating bars, and provided with stop pawls adapted to engage the toothed disks, cams bearing on the other ends of the bell crank levers, mechanism controlling the intermittent operation of said cams to rock the bell-crank levers, members bearing scales connected to said toothed disks and pointers coöperating with said scale members.

5. In a speed indicator, the combination of a driving shaft under constant stress tending to rotate it at the rate of one revolution per minute, a slotted disk carried by said driving shaft, a toothed disk under constant stress tending to rotate it and controlled in its intermittent rotation by the slotted disk, cams connected to move with the toothed disk, levers and stop pawls thereon controlled by said cams, toothed disks controlled by said stop pawls, operating bars controlled by said levers, pawls on the operating bars for actuating the toothed disks, means for actuating the operating bars from a rotating part of a moving vehicle, and pointers and members bearing scales having relative movement due to the movement of the toothed disks.

6. In a speed indicator, the combination of a driving shaft under constant stress tending to rotate it at the rate of one revolution per minute, a slotted disk carried by said driving shaft, a toothed disk under constant stress tending to rotate it and adapted to be engaged by the slotted disk, cams connected to move with the toothed disk, levers and stop pawls thereon adapted to be rocked by said cams, toothed disks controlled by said stop pawls, a main shaft adapted to be connected to the rotating part of a moving vehicle, operating bars eccentrically mounted on said main shaft and controlled by the said levers, spring pressed operating pawls carried by said levers adapted to engage the toothed disks, and pointers and members bearing scales having relative movement due to the movement of the toothed disks.

7. In a speed indicator, the combination of a driving part under constant stress tending to rotate it at a given constant rate per minute, a pair of controlling levers having stop pawls, rotary connecting means under constant stress controlled by said driving part for alternately operating said controlling levers, a pair of toothed disks adapted to be arrested by said stop pawls, a main part adapted to be connected to the rotating part of a moving vehicle, means for operatively connecting said main part to actuate the disks, and scales and pointers having relative movement due to the movement of the disks.

8. In a speed indicator, the combination of a slotted disk connected to rotate at a given rate of speed, a toothed disk under constant stress tending to rotate it and coöperating with said slotted disk, cams actuated with said toothed disk, bell crank levers rocked by said cams, stop pawls carried by said levers, operating bars controlled by said levers, actuating pawls carried by said bars, means for actuating said bars from a rotating part of a moving vehicle, toothed disks engaged by said stop pawls and said actuating pawls, and member bearing scales connected to be moved by said toothed disks.

9. In a speed indicator, the combination of a driving disk connected to rotate at a given rate of speed, a toothed disk under constant stress tending to rotate it controlled by the driving disk, operating bars and pawls, toothed disks actuated by said pawls, stop pawls, means connected to be actuated by the movement of the driving disk for controlling the operating bars, means for actuating said bars, member bearing scales connected to said toothed disks, and means for preventing the indicating mechanism from operating.

10. In a speed indicator, the combination of a pair of pointers and members bearing scales, actuating means connected to impart relative movement to each scale member and its pointer alternately through a distance corresponding to the average speed at which a moving vehicle is traveling, and means for maintaining the speed reading on each scale member alternately for a given time, and then returning the scale member to zero reading preparatory to recommencing the cycle of operations.

11. In a speed indicator, the combination of a pair of pointers and members bearing scales, actuating means connected to impart relative movement to each scale member and its pointer alternately through a distance proportional to the average speed at which a moving vehicle is traveling, and means for setting the scale members at zero reading and holding them until the device is started in operation.

12. In a speed indicator, the combination of a pair of pointers and members bearing scales, means for alternately actuating the same, and means for setting the scale members at zero reading and maintaining them at such reading until it is desired to start the device in operation.

In testimony whereof I have signed this specification in the presence of two subscribing witnesses.

LOUIS E. SHAW.

Witnesses:
 OLIN A. FOSTER,
 HERMAN MORRIS.